(12) United States Patent
Rampf

(10) Patent No.: US 8,286,844 B2
(45) Date of Patent: Oct. 16, 2012

(54) HOLDER FOR ITEMS

(75) Inventor: Klaus-Dieter Rampf, Tuebingen (DE)

(73) Assignee: GM Global Technology Operations LLC, Detroit, MI (US)

( * ) Notice: Subject to any disclaimer, the term of this patent is extended or adjusted under 35 U.S.C. 154(b) by 391 days.

(21) Appl. No.: 12/634,567

(22) Filed: Dec. 9, 2009

(65) Prior Publication Data

US 2010/0147917 A1    Jun. 17, 2010

(30) Foreign Application Priority Data

Dec. 15, 2008   (DE) .................. 10 2008 062 278

(51) Int. Cl.
*B60N 3/10*      (2006.01)
(52) U.S. Cl. .................. 224/539; 224/926; 248/311.2
(58) Field of Classification Search .................. 224/926, 224/539; 248/311.2
See application file for complete search history.

(56) References Cited

U.S. PATENT DOCUMENTS

| | | | |
|---|---|---|---|
| 5,170,980 A | 12/1992 | Burrows et al. | |
| 5,704,579 A * | 1/1998 | Celentino et al. | 248/311.2 |
| 5,931,431 A | 8/1999 | Stinnett | |
| 6,039,296 A | 3/2000 | Nishina et al. | |
| 6,189,755 B1 * | 2/2001 | Wakefield | 224/542 |
| 6,547,117 B2 * | 4/2003 | Glovatsky et al. | 224/539 |
| 7,168,669 B2 * | 1/2007 | Park | 248/311.2 |
| 2002/0008127 A1 | 1/2002 | Glovatsky et al. | |
| 2004/0031895 A1 * | 2/2004 | Langhoff | 248/311.2 |
| 2006/0278790 A1 * | 12/2006 | Park | 248/311.2 |

FOREIGN PATENT DOCUMENTS

| | | |
|---|---|---|
| DE | 19812389 A1 | 11/1998 |
| DE | 19853671 A1 | 6/1999 |
| DE | 19806104 A1 | 8/1999 |
| DE | 10359294 A1 | 5/2005 |
| DE | 102005015859 B3 | 5/2006 |
| DE | 102005017565 A1 | 12/2006 |
| DE | 102005037188 A1 | 2/2007 |
| DE | 102007006898 A1 | 8/2008 |
| EP | 1705058 A1 | 9/2006 |
| FR | 2924995 A1 | 6/2009 |
| GB | 2343430 A | 5/2000 |
| JP | 8216765 A | 8/1996 |

OTHER PUBLICATIONS

German Patent Office, German Search Report for German Application No. 102008062278.8, Feb. 10, 2010.
British Patent Office, British Search Report for British Application No. GB0921035, Mar. 4, 2010.

* cited by examiner

*Primary Examiner* — Justin Larson
(74) *Attorney, Agent, or Firm* — Ingrassia Fisher & Lorenz, P.C.

(57) ABSTRACT

A holder is provided for items, in particular for drinks containers, drinking vessels in a motor vehicle that includes, but is not limited to a storage bin for holding the items. The storage bin has a bottom for holding the items as well as side walls. In such a holder, it is provided that at least one side wall has a variable-shape insert that can be transferred from a position following the contour of this side wall into a position curved in the direction of the opposite side wall. By this means, a variable division of the storage bin can be accomplished with simple design and extremely simple handling.

14 Claims, 2 Drawing Sheets

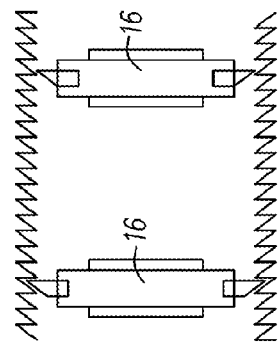
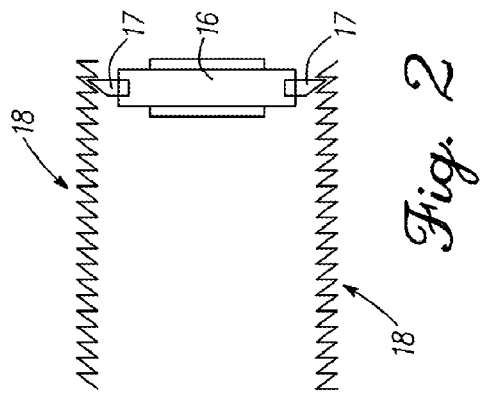
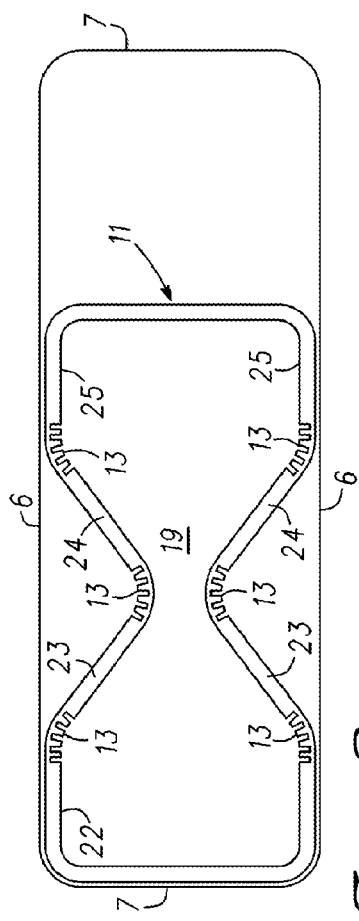
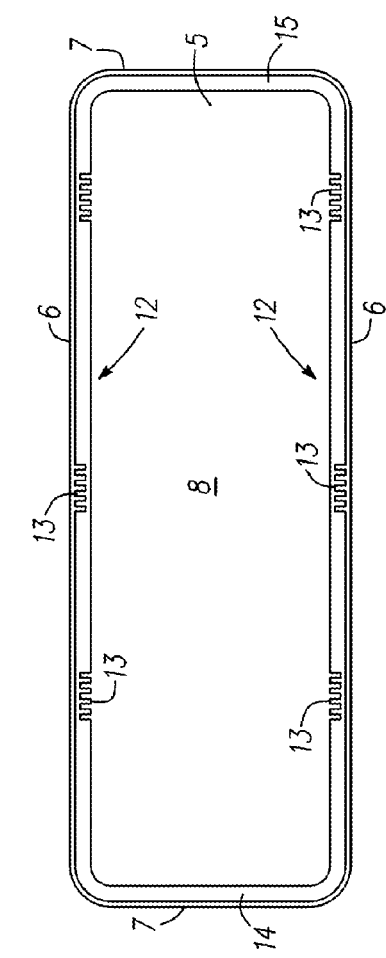

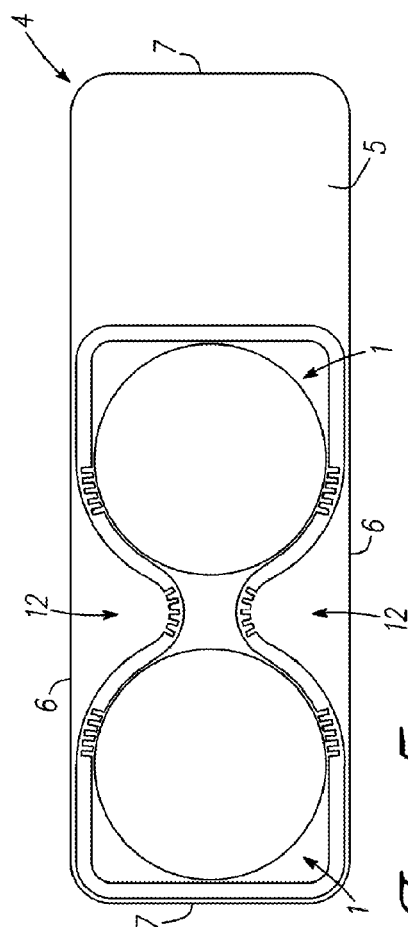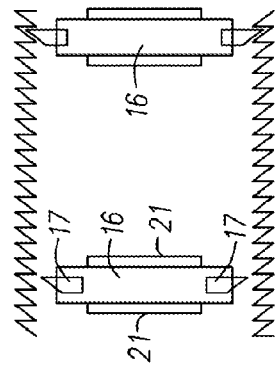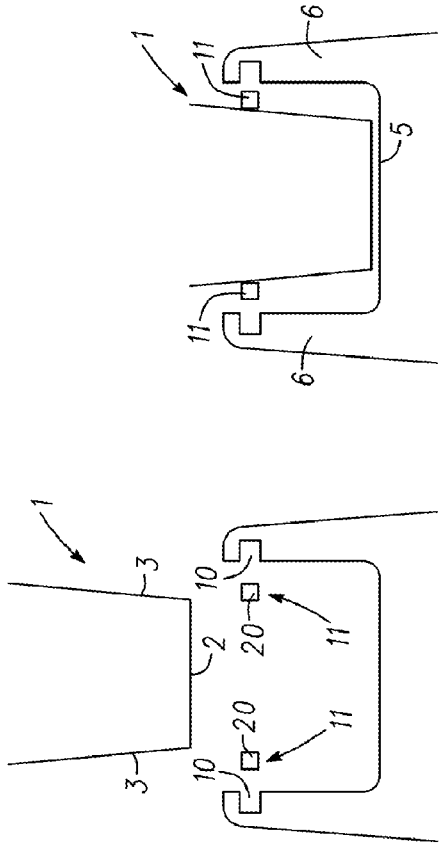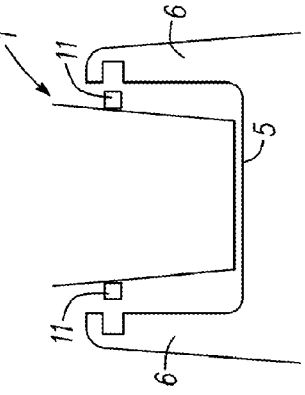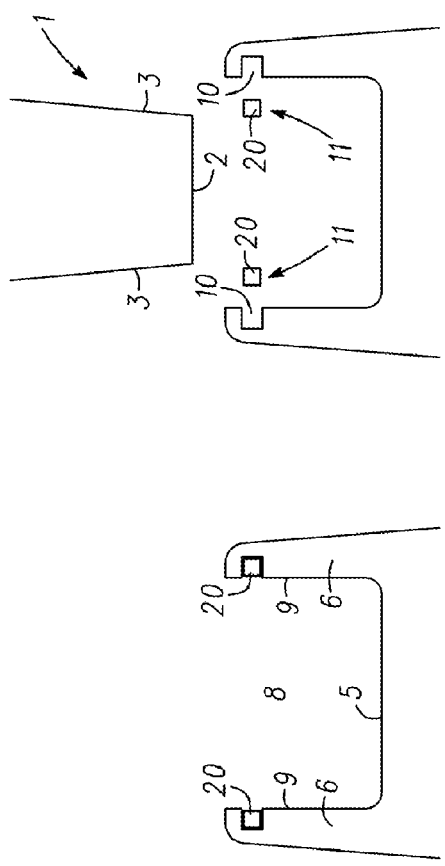

HOLDER FOR ITEMS

CROSS-REFERENCE TO RELATED APPLICATION

This application claims priority to German Patent Application No. 102008062278.8, filed Dec. 15, 2008, which is incorporated herein by reference in its entirety.

TECHNICAL FIELD

The invention relates to a holder for items, in particular for drinks containers, drinking vessels in a motor vehicle, comprising a storage bin for holding the items, wherein the storage bin has a bottom for holding the items as well as side walls.

BACKGROUND

Holders are known from the prior art in various designs. Known from U.S. Pat. No. 5,170,980, for example, is a holder of the said type, in which the storage bin is elongated, having long, parallel-running side walls and side walls disposed in the region of the front sides of the storage bin, which connect these side walls, and which are configured to be semicircular. In the region of the semicircular side walls, the storage bin accommodates semicircular insert elements which are connected to a bottom portion pivotably mounted in the bottom of the storage bin. In that position of the insert elements in which these abut against the curved side walls of the storage bin, a relatively large receiving space for one or more items is formed inside the storage bin. By pivoting the one or possibly two insert elements through 180° in each case, the receiving space of the storage bin can be divided into a plurality of partial spaces, these partial spaces being suitable for receiving items of smaller dimensions.

A disadvantage with this holder is that it is structurally highly complex since a semicircular configuration of the side walls located in the front regions of the storage bin is required to receive the pivotable semicircular insert elements. Moreover, the pivotable mounting of the insert elements is structurally complex. In addition, the storage bin can only be divided taking into account the semicircular contour of the insert elements.

It is at least one object of the invention to further develop a holder for items of the type specified initially in such a manner that with the simplest design and simplest handling, a variable division of the storage bin can be accomplished. In addition, other objects, desirable features, and characteristics will become apparent from the subsequent summary and detailed description, and the appended claims, taken in conjunction with the accompanying drawings and this background.

SUMMARY

The at least one object, other objects, desirable features, and characteristics are achieved by at least one side wall having a variable-shape insert, which can be transferred from a position following the contour of this side wall into a position curved in the direction of the opposite side wall.

In particular, side walls have variable-shape inserts on mutually facing sides of these side walls, which can be transferred from a position following the contour of these side walls into a curved position, in which the variable-shape inserts are curved toward one another.

If the respective variable-shape insert is located in a position in which it follows the contour of the side wall associated with the insert, this variable-shape insert does not project or does not appreciably project in to the receiving space formed by the storage bin so that this entire receiving space is available un-divided for receiving a larger or a plurality of smaller items. If, on the other hand, smaller items are to be accommodated by the storage bin and it is desired to divide the storage bin in this connection, the respective variable-shape insert is transferred into its curved position, in which this variable-shape insert is curved in the direction of the opposite side wall or the opposite variable-shape insert likewise located in the curved position. As a result of this curvature of the respective variable-shape insert, the entire inside cross-section of the storage bin in the region of the variable-shape insert is no longer available but a constriction occurs there, dividing the receiving space of the storage bin. Depending on the design of the variable-shape insert or inserts, the respective insert can be transferred into the curved position at several points so that more than merely two receiving spaces formed by the constriction are formed in the storage bin.

In principle, it is sufficient if only one side wall has the variable-shape insert. Due to this design, the variable-shape insert can be curved in the region of at least one section in the direction of the opposite side wall. If the opposite side wall also has a variable-shape insert, this variable-shape insert can accordingly be curved in the direction of the first-mentioned variable-shape insert. According to this embodiment, two variable-shape inserts forming independent components are to be provided. Under this aspect, an advantageous alternative provides that the variable-shape inserts are part of a ring so that the ring forms a unit. This ring can be positioned particularly simply in the storage bin and a simultaneous shape change of the inserts can be effected by acting upon the ring.

It is considered to be structurally particularly advantageous if four side walls are provided, which form the shape of a rectangle or trapezium. The side walls can also be disposed in the manner of an oval. In particular, at least the two side walls disposed in the longitudinal direction of the storage bin receive the variable-shape inserts. In the particular case of the ring, in particular three side walls of the storage bin receive the ring. A force to deform the ring and therefore the variable-shape inserts can be applied externally via that region associated with the fourth side wall of the storage bin, for example, by means of a slider which is adjustable parallel to the front side walls of the storage bin.

The ring, for example, has a circular cross-section and is configured in the manner of an O-ring. Other cross-sectional configurations of the ring are feasible, for example, a rectangular cross-section or another suitable cross-section which is in particular provided with a lip.

The shape variability of the inserts can be accomplished in a different manner. Thus, it is provided, for example, that the respective variable-shape insert has sections, which can be varied in their position with respect to one another by means of a hinge, in particular a film hinge, a desired break point or a material weakening. The ring is in particular configured to be rigid apart from the sections, which are variable in relation to their position with respect to one another. On the other hand, it is completely feasible that the variable-shape inserts, in particular the ring, substantially consist/consists of rubber or a flexible plastic. Flexible reinforcements can be provided in the regions of the insert to be bent.

According to a specific embodiment, the respective variable-shape insert has four sections per variable-shape region, which are variable in their position with respect to one another. These four sections follow the contour of the facing side wall in their non-curved position. On transferring the variable-shape inserts into the curved position, the two outer sections still follow the contour of the side walls and the two inner sections are disposed at an angle of <180° with respect to one another and accordingly directed from this side wall to the opposite side wall, wherein the two outer sections are positioned closed to one another. For transferring the variable-shape inserts into their curved position, it is therefore merely necessary to displace one outer attachment in the direction of the other outer attachment.

The mounting of the variable-shape inserts or the ring in the side walls is affected in particular in such a manner that the side walls have grooves, preferably grooves disposed parallel to the bottom, for receiving the variable-shape inserts or the ring. The dimensions of the grooves or inserts should be matched to one another in such a manner that the inserts can be displaced largely free from friction in the longitudinal direction of the grooves.

The variable-shape inserts or the ring are preferably supported against one of the side walls at the front and in the region of the side wall opposite to this side wall, a slider is displaceably mounted in the storage bin, which contacts the variable-shape inserts on their other front side. This configuration makes it possible to simply displace the region of the variable-shape inserts facing the slider or the ring by means of the slider. The slider is in particular adjustable parallel to the side walls, which contact the variable-shape inserts at the front side.

It is considered to be particularly advantageous if the slider can be fixed in different positions, so that the variable-shape inserts can be curved with respect to one another by different degrees, resulting in variously severe constriction of the receiving space of the storage bin. In particular, it is provided that the slider is displaceably mounted in the side walls disposed in the longitudinal direction of the storage bin and can be fixed in different displacement positions with the side walls. This is preferably accomplished by means of a locking or clamping connection.

BRIEF DESCRIPTION OF THE DRAWINGS

The present invention will hereinafter be described in conjunction with the following drawing figures, wherein like numerals denote like elements, and:

FIG. 1 shows the holder for items comprising a ring whose component forms the variable-shape inserts, illustrated for the initial position of the inserts, which follow the contour of the side walls running in the longitudinal direction of the storage bin;

FIG. 2 shows, for the configuration of variable-shape inserts according to FIG. 1, a corresponding position of a slider configured as a grip strip, which can be locked in different positions in the longitudinal direction of the storage bin;

FIG. 3 shows the parts shown in FIG. 1 illustrated for the curved position of the variable-shape inserts;

FIG. 4 shows the parts shown in FIG. 2, illustrated for different intermediate positions of the slider;

FIG. 5 shows a diagram of the parts from FIG. 1 and FIG. 3 for the state according to FIG. 3, with drinking cups inserted in the two partial spaces of the storage bin;

FIG. 6 shows the slider shown in FIG. 2 and FIG. 3 in different positions;

FIG. 7 shows a section through the storage bin, cut transversely, in a position of the variable-shape inserts according to FIG. 1;

FIG. 8 shows a section according to FIG. 7, in the region of the variable-shape inserts curved toward one another, before inserting a drinking cup into the receiving space of the storage bin; and FIG. 9 shows the arrangement according to FIG. 8 with a drinking cup inserted in the receiving space of the storage bin.

DETAILED DESCRIPTION

The following detailed description is merely exemplary in nature and is not intended to limit application and uses. Furthermore, there is no intention to be bound by any theory presented in the preceding background or summary or the following detailed description.

The holder according to an embodiment of the invention is used in a motor vehicle, for example, for receiving a drinking cup 1, which in the specific exemplary embodiment is configured to be frustroconical, and thus has a bottom 2 and a peripheral side wall 3. The holder has a storage bin 4 for receiving items, in particular for receiving drinking cups 1. The storage bin 4 has a horizontal bottom 5 and two side walls 6 disposed perpendicularly to the bottom and parallel to one another and likewise front side walls 7 disposed perpendicularly to the bottom 5 and parallel to one another between the side walls 6. Formed between the side walls 6 and 7 is a rectangular receiving space 8 with longitudinally extending side walls 6. In their upper region on the mutually facing sides 9, the side walls 6 have grooves 10, which receive a rectangular ring 11 in the region of its longitudinal sides, these longitudinally running regions of the ring 11 being configured as variable-shape inserts 12. In the specific exemplary embodiment, the ring 11 is formed from a flexible material, wherein however it has desired breaking points or material weakens in six regions 13, in the region whereof the ring 11 can preferably bend.

The one section 14 of the ring connecting the two variable-shape inserts 12 abuts against one side wall 7. The other section 15 of the ring 11 disposed parallel to the section 14 is displaceable by displacing the slider 16 illustrated in FIG. 1 to FIG. 6 separately and parallel to the storage bin 4. Spring-loaded locking elements 17 of the slider 16 can be brought into operative connection with locking strips 18 extending parallel to the side walls 6. On displacing the slider 16 in the direction of the section 14, the slider 16 moves the section 15 in the direction of the section 14 from the initial position of the section 15 shown in FIG. 1. The consequence is that as a result of the various weakening points, the ring 11 can specifically yield and on reaching the position of the slider 16 illustrated on the left in FIG. 4, adopts the position shown in FIG. 3. This substantially constitutes the end position of the ring 11 in which the variable-shape inserts 12 are transferred into their curved position and consequently two receiving partial spaces 19 are formed by constriction. Instead of the large receiving space 8 for one large item or several smaller items, in particular drink cans placed directly adjacent to one another, in the configuration of the storage bin 4 according to FIG. 3, this gives the receiving partial space 19 for one drinking cup 1 or one drinks can and the other receiving partial space 19 for the other drinking cup 1 or another drink can.

As can be deduced from the diagram in FIG. 5, as a result of the flexibility of the ring 11, its contour optimally matches the corresponding size of the drinking cup 1 or the can and therefore provides a very good fixing. The profile of the ring 11 is configured in such a manner that it can be pressed apart by the drinking cups 1 or cans inserted from above. The shape of this cross-section of the ring 11 is illustrated in FIG. 7 to FIG. 9. It is shown there that the ring has a rectangular cross-section but is provided with a thin-walled contact lip 20 toward the interior.

FIG. 6 illustrates that after releasing the slider 16, by for example pressing opposite plates 21 of the slider 16, the locking elements 17 come out of engagement with the locking strips 18 and the slider 16 can be transferred into the initial position according to FIG. 2. The result is that as a result of the intrinsic tension of the ring 11, this moves back into the initial position according to FIG. 1, so that the variable-shape inserts 12 abut against the side walls 6.

The respective variable-shape insert 12 is formed by four sections 22, 23, 24, and 25 with weakened regions 13 disposed between them.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A holder for an item in a motor vehicle, comprising:
   a storage bin for holding the item;
   a bottom of the storage bin for holding the item; and
   a plurality of side walls for the storage bin, a first sidewall of the plurality of side walls comprising a variable-shape insert that can be transferred from a position following a contour of the first sidewall into a curved position in a direction of a second sidewall of the plurality of side walls that is opposite the first sidewall,
   wherein the plurality of side walls comprise a plurality of variable-shape inserts on a mutually facing side of the plurality of side walls that can be transferred from the position following the contour into the curved position in which the plurality of variable-shape inserts are curved toward one another,
   wherein the plurality of side walls comprise a plurality of grooves disposed substantially parallel to a bottom for receiving the plurality of variable-shape inserts, and
   wherein the plurality of variable-shape inserts are supported against a side wall at a front, and in a region of an opposite side wall, a slider is displaceably mounted in the storage bin that contacts the plurality of variable-shape inserts on another front side.

2. The holder according to claim 1, wherein at least one of the plurality of variable-shape inserts has a plurality sections that can be varied in a second position with respect to one another with a desired break point.

3. The holder according to claim 1, wherein at least one of the plurality of variable-shape inserts has a plurality sections that can be varied in a second position with respect to one another with a material weakening.

4. The holder according to claim 1, wherein at least one of the plurality of variable-shape inserts substantially comprises a rubber.

5. The holder according to claim 1, wherein at least one of the plurality of variable-shape inserts substantially comprises a flexible plastic.

6. The holder according to claim 1, wherein at least one of the plurality of variable-shape inserts has at least four sections per variable-shape region that are variable in a second position with respect to one another.

7. The holder according to claim 1, wherein the slider is adjustable parallel to the plurality of side walls that contact the plurality of variable-shape inserts at a front side.

8. The holder according to claim 1, wherein the slider is displaceably mounted in the plurality of side walls disposed in a longitudinal direction of the storage bin and substantially fixed in a plurality of displacement positions with the plurality of side walls.

9. The holder according to claim 1, wherein the plurality of side walls is at least four side walls and form a rectangle.

10. The holder according to claim 9, wherein at least one side wall of the at least four side walls disposed in a longitudinal direction of the storage bin and receives at least one of a plurality of variable-shape inserts.

11. The holder according to claim 10, wherein at least one of the plurality of variable-shape inserts has a plurality of sections that can be varied in a second position with respect to one another with a hinge.

12. The holder according to claim 1, wherein the plurality of side walls receives a ring and the plurality of variable-shape inserts are configured to form part of the ring.

13. The holder according to claim 12, wherein the ring has a substantially square cross-section.

14. The holder according to claim 12, wherein the ring is rigid apart from a plurality of sections that are variable in relation to a second position with respect to one another.

\* \* \* \* \*